No. 749,340. PATENTED JAN. 12, 1904.
T. R. TIMBY.
COFFEE TREATING MACHINE.
APPLICATION FILED NOV. 23, 1901.
NO MODEL. 2 SHEETS—SHEET 1.

Witnesses
Chas. N. Davies.
M. E. Brown.

Inventor
T. R. Timby
by W. A. Bartlett
Attorney

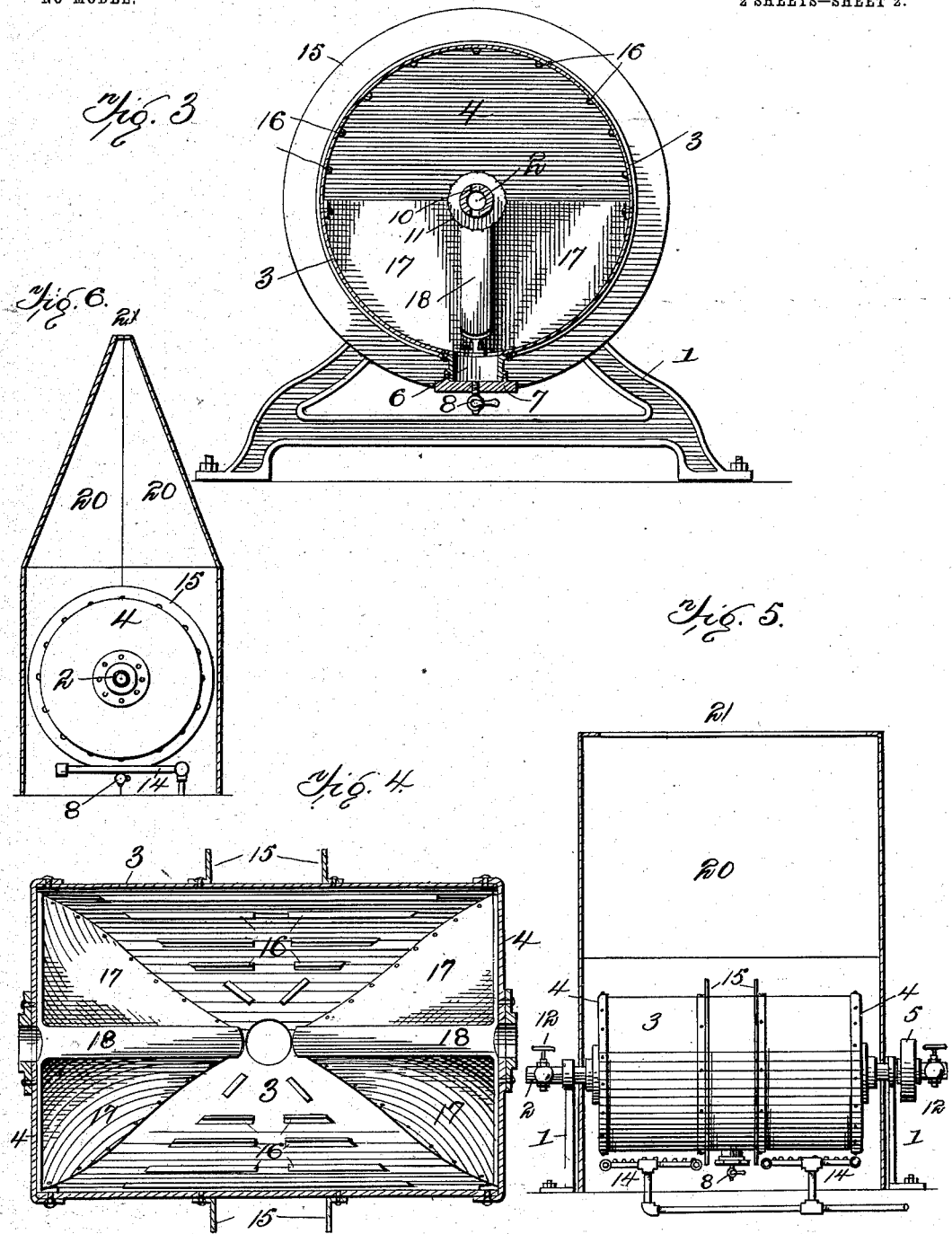

No. 749,340. Patented January 12, 1904.

UNITED STATES PATENT OFFICE.

THEODORE R. TIMBY, OF BROOKLYN, NEW YORK.

COFFEE-TREATING MACHINE.

SPECIFICATION forming part of Letters Patent No. 749,340, dated January 12, 1904.

Application filed November 23, 1901. Serial No. 83,433. (No model.)

*To all whom it may concern:*

Be it known that I, THEODORE R. TIMBY, residing at Brooklyn, in the county of Kings and State of New York, have invented certain new and useful Improvements in Coffee-Treating Machines, of which the following is a specification, reference being had therein to the accompanying drawings.

This invention relates to machines for sweating, roasting, and polishing coffee.

The object of the invention is to produce a machine in which coffee-beans may be "tempered," "dried," or "sweated," as it is termed, and then removed, or the coffee may be tempered or not and then roasted, or the coffee-beans may be tumbled in the machine and thus scoured or polished; and the invention consists in certain improved constructions and combinations of mechanical elements, as will be hereinafter described and claimed.

Figure 1:
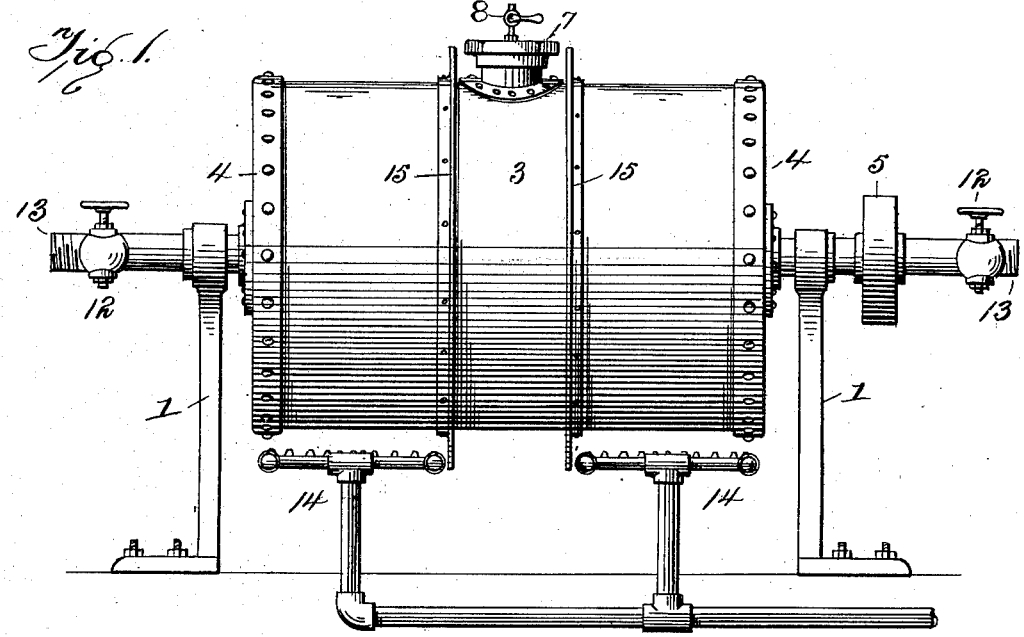
Figure 2:
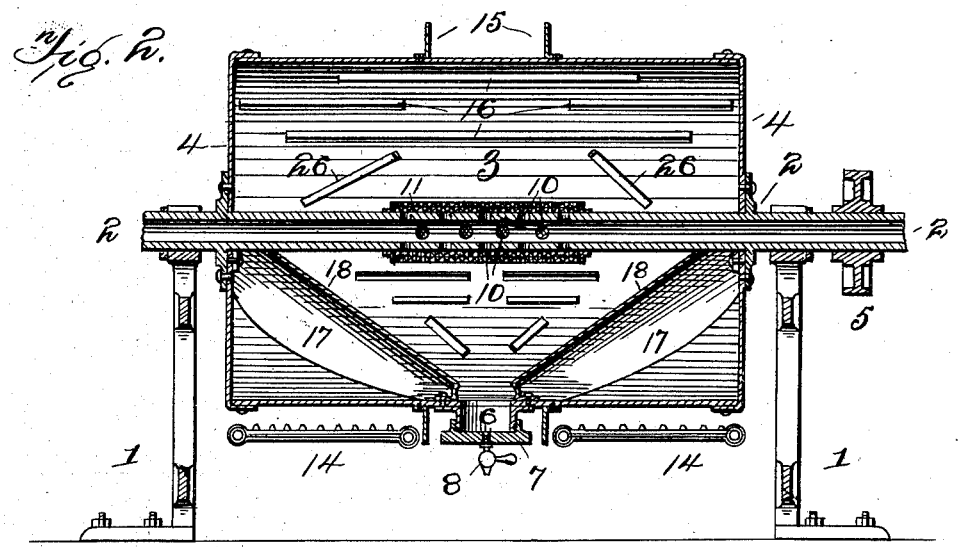

Figure 1 is a side elevation of the machine. Fig. 2 is a vertical longitudinal central section. Fig. 3 is a central cross-section. Fig. 4 is a top plan of the bottom segment of hollow cylindrical shell. Fig. 5 is a side view of a modification, showing a machine with inclosing cover. Fig. 6 is an end view of the machine with cover.

Let 1 1 indicate brackets, legs, or standards which support the hollow shaft 2, the shaft being held in bearings, so as to rotate easily.

A strong metallic drum, shell, or cylinder 3 is supported on tubular shaft 2. The cylinder is strong enough to endure considerable internal pressure and has ends 4 4 attached to shaft 2, so that the cylinder or drum revolves with shaft 2, the ends 4 being turned over the cylindrical sides of shell 3. Shaft 2 is provided with a driving-pulley 5 or other suitable means of causing the shaft and the attached drum to rotate together.

A manhole 6 in one side of the cylinder or drum 3, and preferably near the middle of the drum, has a cover 7, which may be removed or may be firmly attached by a screw-thread or in other suitable manner. The head 7 preferably has a ventilating-cock 8, through which air, gas, or steam may be permitted to escape on occasion.

The tubular shaft 2 has a number of openings 10 within the drum, through which openings steam or gas may be permitted to pass from the interior of the cylinder to the passage in the tubular shaft. The openings 10 are covered by a wire-gauze cage 11, which prevents the extrance of coffee-beans and of impurities into the air-passage in the shaft, but permits passage of fine dust.

A cock or valve 12 near each end of shaft 2 closes the passage in the shaft when desirable. One of these cocks may be opened to permit the escape of steam or gas from the interior of the cylinder. Should the gauze cage 11 clog with dust, an air-blast may be blown through the shaft and into the cylinder, as by a nozzle or hose attached at 13 to the shaft by screw-thread or in other convenient manner, and so clear the gauze cage or screen.

Under the cylinder there are heaters 14 14, which may be gas-burners or any other convenient form of heater. These heaters are placed at each side of the manhole—that is, between the manhole and the end of the cylinder.

At each side of the manhole and cover there is a strong ring or flange 15 surrounding the drum and projecting about as far as the manhole-cover from the cylindrical surface of the drum. These rings or flanges not only serve to strengthen the drum or cylinder, but also guide the heat toward the ends of the drum and away from the cover 7, thus leaving a central zone on the drum which is heated less than the end sections.

Inside the drum and arranged at intervals for rather more than half the circumference of the drum there are arranged ribs or strips 16. These ribs or strips vary in length, and their purpose is to cause the coffee-beans to ride up with the ascending side of the drum when said drum is rotated and fall from the edges of the ribs, thus securing thorough mixing and rubbing of the beans together, rather than to permit them to slide along a smooth cylindrical surface, as would be the case were such ribs omitted.

At the side of the cylinder in which the manhole is located (and which may be called the "bottom" segment, although the whole cylinder rotates on occasion and therefore the bottom segment at times comes uppermost)

and on the interior of the shell inclined concavo-cycloidal plates 17 17 are arranged and are firmly secured at their edges to the shell. These concavo-cycloidal plates, preferably of sheet brass or copper, have a central rib 18, which rib lies under the shaft 2 when the manhole is at the bottom of the cylinder. In such position the plates 17 form four inclined passages sloping from the ends of the cylinder toward the manhole, the passages at each end of the shell being separated by rib 18. Between the plates 17 and the sides of the drum there is an air-space. When the drum is heated, the air in such space becomes very hot, and so heats plates 17; but these plates 17 do not become heated to the same degree as the shell proper, and this difference of temperature, as well as that of the zone between ribs 15, is of advantage in tempering or treating the coffee.

When the drum is to be charged with coffee-beans, the manhole is turned to the top and the coffee is poured in to the desired amount, which should be from one-fourth to one-half the capacity of the cylinder. The cover of the manhole is then firmly applied, and if the coffee is to be seasoned or roasted heat is applied to the outside of the shell and the shell is slowly rotated. As the ribs 16 lift the coffee it falls down, and as the inclined plates 17 come to the lower side of the cylinder the beans which fall on said plates tend toward the middle part of the drum over the manhole-cover. As this part of the shell rises in the further revolution of the shell the beans are spread out and tend to form a thin layer. Thus there is not only a lateral but a longitudinal movement of the beans among themselves, tending to polish the beans very effectively. Should the coffee tend too much toward the middle zone of the drum, the ribs, or some of them, may be placed diagonally, as shown at 26. In the coffee-roasting process I may open one of the cocks 12 to temporarily relieve pressure.

Coffee already roasted may be polished in this shell without the application of heat, the shell acting as a tumbling-box. "Green" coffee may be dried and tempered or may be roasted or roasted and polished, as has been explained. All treatment in the rotating drum has a polishing effect.

When the shell is to be emptied, the manhole is turned down and the cylinder rocked back and forth through a small arc. This will cause the beans to slide down the inclines 17 until all escape at the manhole, where provision is made for the removal of the coffee.

In some cases the cylinder or drum may be inclosed in a casing 20, which casing is preferably of sheet metal and removable, so as to give ready access to the cylinder. The casing stands upright on the floor and tapers toward the top and is there open at 21 to permit escape of smoke and gases; but this opening may be closed by a suitable damper. The casing 20 confines the heat around the drum and prevents its escape into the room. It is made in two sections, either one of which may be removed separately.

The plates 17, to which reference has been made, permit the coffee-beans to slide on their inclined surfaces more readily than the coffee would move along ribs of similar inclination. Consequently the coffee-beans under treatment have a variety of movements and come in contact with metallic surfaces at different temperatures, which tends to give a tempering effect to the coffee under treatment.

What I claim is—

1. A tumbling-drum for treating coffee, consisting of a hollow cylindrical casing mounted on a horizontal shaft, said casing having central manhole and having inclined plates extending from the ends of the casing toward the central manhole, near which hole the plates are attached to the casing, said casing having longitudinal ribs and obliquely-arranged ribs on its inner side remote from the manhole.

2. A coffee-treating machine consisting essentially of a hollow cylindrical drum mounted on a horizontal shaft and provided with means for rotating the same, said cylinder having a manhole about midway of its length, a projecting annular flange at each side of the manhole, and means for heating the cylinder between said flanges and the ends of the cylinder.

3. The combination with a hollow metallic cylinder supported on a horizontal shaft, a central manhole and cover, annular flanges projecting from the cylinder at each side of the manhole, heating devices between said flanges and the ends of the cylinder, and plates within the cylinder, at one side thereof, which plates incline toward the manhole when the manhole is in lowest position.

4. In a horizontal rotating coffee-treating drum, the combination with means for heating different parts of the drum to different temperatures, of ribs and inclines attached to the casing within the drum, whereby the coffee-beans within the drum are caused to move in both directions longitudinally and laterally over surfaces heated to different temperatures as the drum revolves.

5. In a coffee-roasting machine, the combination with a horizontal cylinder supported on a shaft, and means for rotating said cylinder, of external annular flanges projecting from said cylinder, and a sheet-metal cover resting on the floor and projecting upward at the sides of the cylinder in close proximity to the annular flanges thereon.

In testimony whereof I affix my signature in presence of two witnesses.

T. R. TIMBY.

Witnesses:
W. A. BARTLETT,
THOMAS BRADLEY.